METHOD AND APPARATUS FOR CENTRIFUGAL SEPARATION

Original Filed April 11, 1968 2 Sheets-Sheet 1

INVENTOR:
WILLIAM LAUT,
BY Kingsland, Rogers, Ezell, Eilers + Robbins
ATTORNEYS

METHOD AND APPARATUS FOR CENTRIFUGAL SEPARATION

Original Filed April 11, 1968 2 Sheets-Sheet 2

INVENTOR:
WILLIAM LAUT,
BY Kingsland, Rogers, Ezell, Eilers & Robbins
ATTORNEYS

United States Patent Office

Re. 27,493
Reissued Sept. 26, 1972

27,493

METHOD AND APPARATUS FOR CENTRIFUGAL SEPARATION

William Laut, 12647 Tallow Hill Lane,
St. Louis, Mo. 63141

Original No. 3,464,554, dated Sept. 2, 1969, Ser. No. 720,530, Apr. 11, 1968. Application for reissue Jan. 8, 1971, Ser. No. 105,106
Int. Cl. B01d *33/02;* B04b *3/00*
U.S. Cl. 210—78 11 Claims

Matter enclosed in heavy brackets [ ] appears in the original patent but forms no part of this reissue specification; matter printed in italics indicates the additions made by reissue.

ABSTRACT OF THE DISCLOSURE

A centrifugal filter bowl or receptacle is rotated in a housing to expel fluid upwardly and out a peripheral filter passage formed between compressed finished peripheral surfaces of the receptacle and its top. A center post in the receptacle is tubular, opens through the top, and connects through a union mounted in the housing, with a source of fluid. The interior of the receptacle is sealed except for the filter passage. When the receptacle rotates, it centrifugally ejects fluid through the peripheral fluid passage, drawing new fluid by suction through the inlet to the bottom of the receptacle whence it flows with a scrubbing action up the wall of the receptacle to the filter passage.

Summary of the invention

The invention includes the provision of a continuous centrifugal filter that can separate much finer materials than centrifugal filters heretofore have done, and can do so in a continuous manner, rather than in a batch process. The invention also comprises feeding the material into the bottom of a filter cone where it can scrub the surfaces of the cone before it reaches the filtering area. It also includes providing bearings on the two opposite sides of the filter cone to give stability against eccentric loading of the cone. It provides means for compressing the filter plate onto the filter cone with resilient force sufficiently great to insure close fit of the parts and a maximum effort. It includes ready separability of the parts so that they may be cleaned. Other features will appear from the detailed description.

Drawing and detailed description

Figure 1:
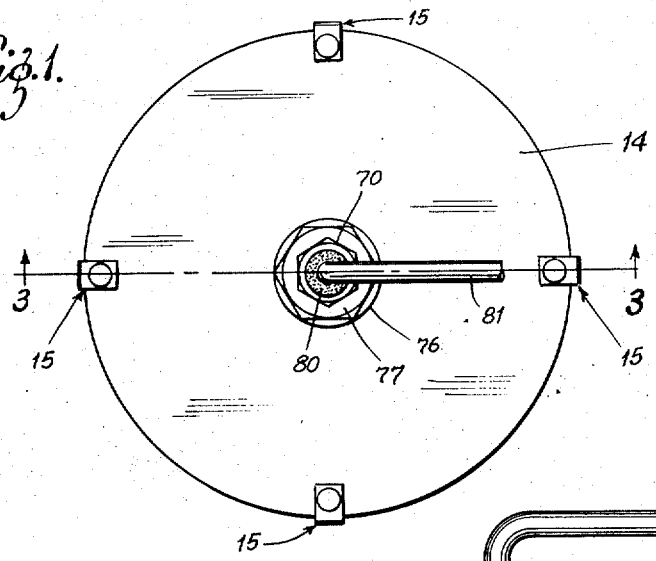
FIGURE 1 is a top plan view of the apparatus comprising the present invention.
Figure 2:
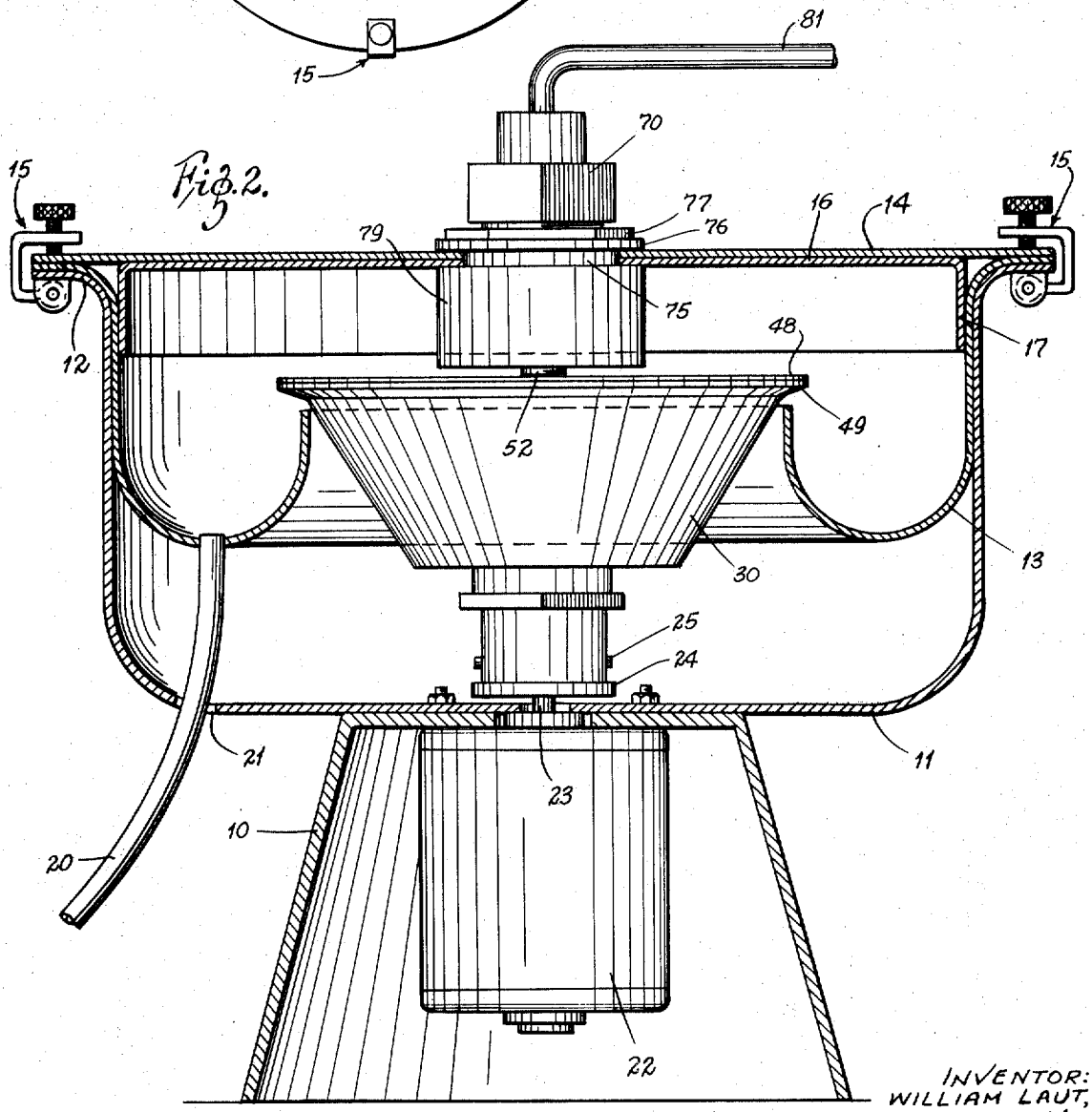
FIGURE 2 is an enlarged side view, partly in section, of the apparatus.

The device is illustrated as having an appropriate base 10 on which a bowl-shaped housing 11 is secured. The upper edge of the bowl-shaped housing 11 is flanged outwardly as indicated at 12. An annular filtrate receptacle 13 fits within the housing 11 with a flange overlying that of the housing. The cover plate 14 closes the top of the housing 11, and overlies the two flanges aforesaid so that appropriate clamping means 15 can be used to secure the cover firmly in place. An inner plate 16 has a flange 17 depending from it. The plate 16 is secured to the underside of the cover 14, so that the flange 17 will fit against the inner wall of the annular receptacle 13, and minimize any lateral displacement of the cover 14 with respect to the housing 11, since it is very desirable that these parts be held firmly together during action.

There is a discharge pipe 20 that can lead from the annular receptacle 13, to carry off filtrate as desired. The pipe passes through an opening 21 in the housing 11.

Within the base 10 there is an electric motor 22, that has its motor shaft 23 projecting through and into the bowl 11. The motor shaft has a conical male type fitting 24 with a transverse pin 25 extending therethrough. Appropriate means are provided for starting and stopping the motor and for adjusting its speed of rotation.

Figure 3:
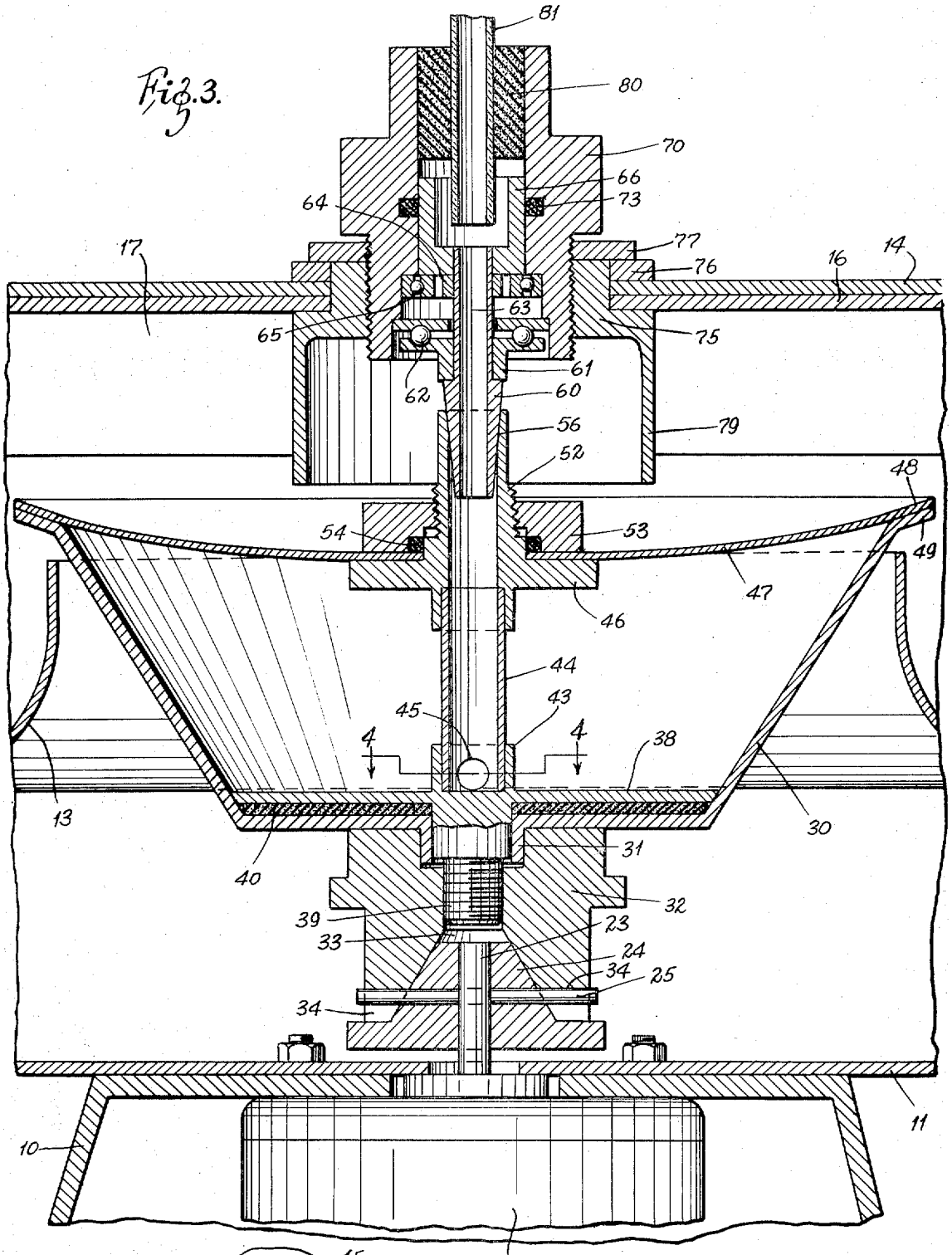
FIGURE 3 is a further enlarged vertical sectional view taken on the line 3—3 of FIGURE 1.
Figure 4:
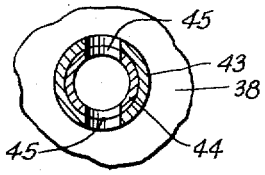
FIGURE 4 is a fragmentary sectional view taken on the line 4—4 of FIGURE 3.

The filter cone is mounted on the motor shaft as shown particularly in FIGURE 3. The filter cone comprises a bowl 30, of frusto conical shape with a central opening therein, having a downturned flange 31. This flange fits into an appropriate recess in a motor shaft mounting member 32 that has a conical recess 33 in its lower end to engage over the conical fitting 24 on the motor shaft. The fitting 32 also has opposed recesses 34 that fit over the pin 25 to prevent relative rotation between the two fittings when they are engaged together, and to insure transmission of torque from the motor to the filter cone.

Within the bottom of the filter cone there is a disc 38 having a central depending threaded plug 39 that engages in a threaded opening in the fitting 32. A gasket 40 is interposed between the plate 38 and the bottom wall of the filter cone. These parts should be made to minimize crevices that could collect solid material. When the plate 38 is threaded into the fitting 32, a tight seal is provided by the gasket 40. The tight engagement of these parts also insures that the filter cone 30 will be non-rotatable wtih respect to the fitting 32.

The plate 38 also has an upstanding tubular extension 43 into which is pressed a tube 44, that constitutes part of a sealed inlet passage. At the bottom of the tube 44 and continued through the upstanding tubular flange 43 are two opposite discharge ports 45. These ports are located at the bottom of the filter cone.

At the top of the tube 44 is permanently pressfitted a fitting 46 with a depending tubular flange portion to receive the tube 44. The fitting 46 extends radially outwardly to receive an imperforate metal filter disc 47, that extends outwardly and that is bowed downwardly as illustrated. The outer rim of the disc 47 is designated 48 and engages over an outstanding flange rim 49 of the filter cone 30. The interfaces of the rim 48 and the rim 49 should be highly polished and both parts are usually made of some metal like stainless steel, to insure the maximum degree of fit between them, as well as freedom from corrosion. These parts may also be made of plastic. The space between them is the filter passage, and it will be seen that it discharges into the receptacle 13.

The fitting 46 has a tubular upstanding threaded portion 52 that receives a knurled nut 53 provided with an O-ring seal 54 as indicated. When the nut is turned down, it engages the top of the filter plate 47 and applies a considerable force thereto urging it against the top flange of the fitting 46 and applying a force to the rim 48. The O-ring 54 is designed to prevent passage of air into or out of the bowl at that point, and to maintain pressure conditions within the bowl independently of those outside of it.

The top of the fitting 46 provides a conical receiving surface 56. The parts thus far described, beginning with the fitting 32 through the fitting 46 and including the filter cone and filter plate, constitute a sub-assembly primarily considering of the rotating filter device.

In order to maintain a sealed inlet passage, means must be provided through the cover to provide for rotation between certain parts and also to provide a bearing fot the rotating parts in the cover.

To the foregoing end there is a tapered male fitting 60 that engages down within the conical socket 56 with a tight ealing fit. The number 60 has one portion 61 of a thrust ıearing 62 pressfitted over an upstanding tubular part 63 hereof. The tubular portion 63 also receives an inner race 4 of a ball bearing 65, and above that receives a cup-haped fitting 66 that is pressed onto it with a perma-ıent fit.

There is a tubular screw part 70 having a lower recess nto which the outer race of the ball bearing 65 is pressed. ınd a somewhat larger recess in which the upper race of he thrust bearing 62 is pressed. This screw part 70 has .n O-ring seal 73 engaging against the outer surface of the ıup-shaped element 66 to provide a seal therebetween.

The screw part 70 is threaded into a flanged nut mem-ıer 75, that engages below and through the plate 16 and he cover 14. A ring 76 on the upper side of the cover 14 s pressfitted permanently over the upstanding portion of he nut 75, and the nut has internal threading to receive xternal threading on the screw 70. A lock nut 77 also ngages the threads on the screw part 70 and can be urned down to insure against undesired unscrewing of hese parts. The nut 75 also has a depending circular flange '9 which overhangs the cover 47 of the filter cone.

An elastic stopper 80 is fitted into the upper interior ›ortion of the screw fitting 70. This stopper receives one ›nd of a rigid glass or metal tube 81 and seals both the ıube 81 and the screw fitting 70 so that there is no escape ›f pressure from or to the interior of the tube.

Operation

The tube 81 is connected into a source of liquid mate-ial that is to be filtered below the surface thereof. The ›ource of material should not be too low, but should not ›e so high that material flows into the filter cone by grav-ty, since the control of the rate of filtration is better when gravity does not play a part. The tube 81, the cup fitting 56, the tubular fitting 60, the tubular fitting 46, and the ıube 44 constitute a sealed inlet passage through which material may be delivered by way of the ports 45 to the ›ottom center of the filter cone 30.

When the motor rotates at high enough speed, centrif-ıgal force will drive even air within the filter cone out he filter passage leaving a reduced pressure area around he openings 45. This suction will draw in liquid material ıt a rate determined by the egress of fluid through the filter passage. The material flows outwardly from the ports 45, across the top of the plate 38, to the conical walls of he filter cone 30, and then upwardly to the filter passage ›etween the rims 48 and 49. There the liquid phase is driven out through the filter passage by a combination of centrifugal and capillary forces. The more dense material that cannot flow through the filter passage is retained with-in the filter cone. This may consist of fine solid particles.

As the liquid phase is discharged from the filter passage, the low pressure condition adjacent the ports 45 is main-tained. Consequently, additional material is drawn in through the inlet passage and the filtration operation pro-ceeds continuously without the necessity of batch feeding which is very much slower.

The force supplied by the nut 53 to the top of the filter plate 47 causes the rims 48, 49, to be forced together snugly. It is desirable that these surfaces be highly pol-ished so that there is a minimum of space between them, and consequently the filtering is superior. Under some circumstances a filter paper can be used, and it should be one that fits between the fitting 46 and the cover plate 47, extends outwardly from the plate 47, and then fits into the filter passage 48 and 49. Another alternative is to incorporate within the material being filtered some form of finely divided material which can accumulate at the inlet of the filtering space and increasing the filtering action, or it may pass into the filter space and increase the size thereof to enhance the filtering action.

The inflow of material by the ports 45 at the bottom of the discharge passage causes this material to flow out-wardly across the top of the plate 38, and against the entire inner walls of the cone 30. Consequently, these surfaces are continuously scrubbed so that there is no accumulation of materials on them.

By virtue of the fact that there are bearings above as well as below the filter cone, any eccentric disposition of the load within the cone does not create excessive vibra-tion. This vibration is further reduced by having the snug fit of the cover 14 onto the housing 11, and the secure connection between them.

The parts may be readily assembled and disassembled. In disassembly, the main cover 14 can be removed and the entire filter cone lifted out, separating the fitting 32 from the conical member 24 on the motor shaft. On this action, the fitting 32 will lift off of the pin 25. It is necessary to take care that the joint at 56 will separate in removing the parts as aforesaid.

Normally, the disassembly will be done by first re-moving the stopper 80 and the tube 81 from the fitting 70. Then the screw fitting 70 is unthreaded from the nut 75, after first loosening the lock nut 77. If the joint at 56 does not come apart, at the start of the detachment of the screw fitting 70 from the cover 14, there finally will be an engagement of the depending flange 79 with the filter plate 47. And further unthreading of the fitting 70 will force separation at 56. The flange 79 therefore, must depend far enough to engage the cover 47 before the threads are disengaged at the screw fitting 70 and the nut 75.

Normally, the nut 70 is thus removed before the cover 14 is removed; then when the cover 14 is removed, it gives instant access to the filter cone which can be lifted out of the housing. The nut 53 can be loosened from the threaded portion 52 and the filter plate 47 removed, giving access to the interior of the filter cone for removal of the material therefrom and cleaning thereof. If it is desired to separate the filter cone from the fitting 32, this is done by unscrewing the fitting from the plug 39. This gives access to the gasket 40 for cleaning purposes, or replacement of the gasket.

What is claimed is:

1. In a centrifugal filter apparatus: a circular filtering receptacle having [a bottom and lateral walls extending upwardly and outwardly, said receptacle having] an im-perforate cover, *the receptacle providing a space for the material to be filtered, the receptacle having a peripheral upper edge, and the cover* overlying the upper edge of the receptacle to form a peripheral filter space; means to hold the cover on the receptacle; drive means to connect the receptacle to a rotating motor; a sealed inlet passage means extending through the cover of the receptacle with sealing means between the cover and the inlet passage means to maintain pressure conditions in the passage means and the receptacle; and discharge port means from the passage into the receptacle.

2. In the apparatus of claim 1: the discharge port means opening into the bottom of the receptacle.

3. In the apparatus of claim 1: the inlet passage means including a vertical tube in the middle of the receptacle, and secured to the bottom of the receptacle, a flanged fitting at the top of the tube and fixed thereto, the fitting projecting through the cover to above it and means above the cover forcing the same down against the flange to apply force to press the outer edge of the cover against the upper edge of the receptacle.

4. In the apparatus of claim 1: rotatable support means below the receptacle, and the support means including bearing means above the receptacle to minimize wobbling effects of eccentric loading in the receptacle.

5. In the apparatus of claim 1: the inlet passage means including a part secured to and rotatable with the re-ceptacle, and a part interfitted therewith but non-rotatable, and means sealing them together for relative rotation.

6. In the apparatus of claim 5: the two parts recited in claim 5 being above the cover of the receptacle; antifriction bearing means between them; and a tubular element separably connected to the rotatable part, mounted on and extending through the cover of the receptacle.

7. In the apparatus of claim 1: an outer housing in which the receptacle is mounted, a rotating motor shaft in the housing removably engaged with the drive means, a filtrate receiver in the housing to receive filtrate from the filter space of the receptacle; a housing cover removably secured over the housing and enclosing the receptacle; the inlet passage means including a nonrotatable part in the housing cover, and a rotating part engageable in sealing relation thereto, and connected into the receptacle.

8. In the apparatus of claim 7: detachable means removably mounting the non-rotating part in the housing cover, the rotating part including a section secured to the receptacle and a section secured to the detachable means, the two sections of the inlet means being separable when the receptacle is removed from the housing cover.

9. In a method of centrifuging, the steps of: rotating a receptacle having an imperforate cover defining a peripheral filter space, containing a mass of fluid with the receptacle enclosed and sealed, causing the fluid to flow [upwardly and] outwardly therein to said filter space whereat it is filtered and the filtrate separated from and expelled centrifugally, maintaining the filter space so small that during centrifugal emission of fluid therethrough fluid cannot flow backward therethrough from outside to inside the receptacle, the centrifugal outflow of fluid causing a pressure reduction at the interior of the receptacle, and providing a sealed connection from the source of liquid to be filtered to the interior of the receptacle, and thereby causing inflow of liquid in proportion to outflow of filtrate and providing for continuous filtration.

10. In the method of claim 9: the steps of introducing the liquid to be filtered at the bottom center of the receptacle, whereby it flows outwardly and upwardly across the walls of the receptacle with a scrubbing action.

*11. In the apparatus of claim 1, the filtering receptacle having bottom and lateral walls extending upwardly and outwardly to the said peripheral upper edge.*

References Cited

The following references, cited by the Examiner, are of record in the patented file of this patent or the original patent.

UNITED STATES PATENTS

| | | | |
|---|---|---|---|
| 1,782,179 | 11/1930 | Rodler | 210—382 X |
| 2,295,922 | 9/1942 | Weston | 210—377 X |
| 2,544,816 | 3/1951 | Wedler | 210—369 |
| 3,311,240 | 3/1967 | Hirsch | 210—369 X |

REUBEN FRIEDMAN, Primary Examiner

U.S. Cl. X.R.

210—377, 379